United States Patent
Grubin et al.

(10) Patent No.: US 12,034,844 B1
(45) Date of Patent: Jul. 9, 2024

(54) TECHNIQUES FOR PERFORMING COMPOUND OPERATIONS ON SECURITY MODULES

(71) Applicant: Amazon Technologies, Inc., Seattle, WA (US)

(72) Inventors: Benjamin Grubin, Herndon, VA (US); Steve Preston Lightner Norum, Richmond, VA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 17/543,501

(22) Filed: Dec. 6, 2021

(51) Int. Cl.
*H04L 9/08* (2006.01)
*H04L 9/14* (2006.01)

(52) U.S. Cl.
CPC .......... *H04L 9/0877* (2013.01); *H04L 9/0825* (2013.01); *H04L 9/14* (2013.01)

(58) Field of Classification Search
CPC ....... H04L 9/0877; H04L 9/0825; H04L 9/14; H04L 9/08
See application file for complete search history.

(56) References Cited

U.S. PATENT DOCUMENTS

| | | | | |
|---|---|---|---|---|
| 5,446,652 A | * | 8/1995 | Peterson | G06F 11/2257 703/6 |
| 10,425,225 B1 | * | 9/2019 | Grubin | H04L 9/0643 |
| 2008/0130889 A1 | * | 6/2008 | Qi | H04L 63/0435 380/42 |
| 2016/0004506 A1 | * | 1/2016 | Elmer | G06F 7/5443 708/490 |
| 2016/0182470 A1 | * | 6/2016 | Rubin | H04L 63/20 713/168 |
| 2019/0342079 A1 | * | 11/2019 | Rudzitis | G06F 21/602 |
| 2020/0099674 A1 | * | 3/2020 | Campagna | G06F 21/6218 |
| 2022/0261882 A1 | * | 8/2022 | Youb | G06Q 20/065 |

* cited by examiner

*Primary Examiner* — Quazi Farooqui
(74) *Attorney, Agent, or Firm* — Eversheds Sutherland (US) LLP

(57) ABSTRACT

Systems, devices, and methods are provided for performing compound operations on a security module. In some embodiments, a hardware security module (HSM) comprises executable code that, as a result of execution by one or more processors of the HSM, causes the HSM to obtain a request to perform a compound operation, parse the compound operation to determine a sequence of operations, perform the sequence of operations within a protected execution environment, wherein one or more intermediate results of the sequence of operations are programmatically unexportable from the protected execution environment, determine, based on complete execution of the sequence of operations, an output, and export the final output from the protected execution environment, thereby making it available to external devices.

17 Claims, 9 Drawing Sheets

800

TECHNIQUES FOR PERFORMING COMPOUND OPERATIONS ON SECURITY MODULES

BACKGROUND

A hardware security module (HSM) may refer to a type of security module that safeguards and manages cryptographic material such as cryptographic keys. In contrast to general-purpose computers, security modules may only support a limited number of operations that are relevant to the use of the cryptographic material stored on the security module. For example, a security module may allow external devices to perform encryption and decryption operations via an interface. However, there are various challenges involved in performing more complex sequences of operations. Various aspects of the security and/or performance of security modules may be improved.

Figure 1:
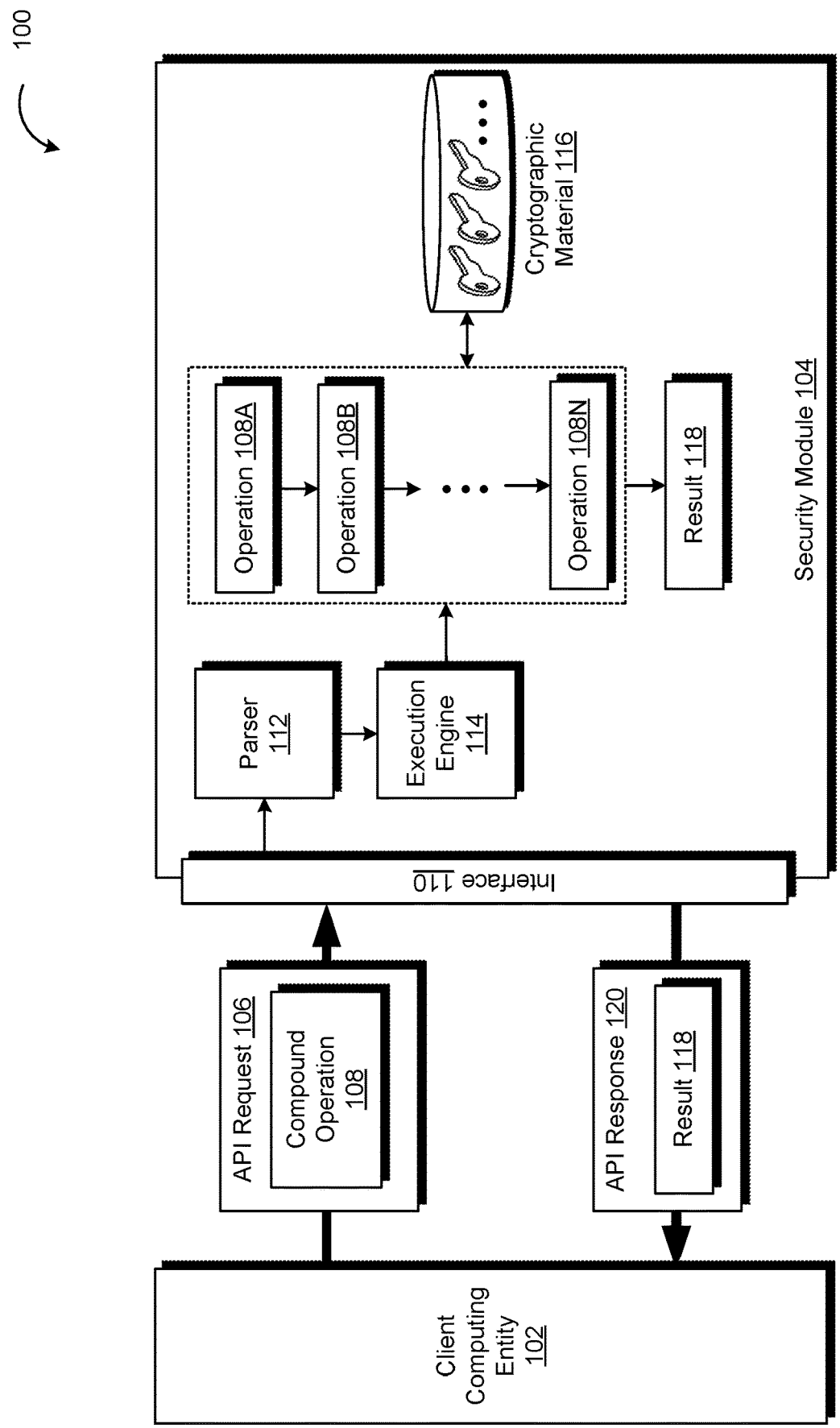
FIG. 1 illustrates a computing environment in which a security module fulfills a request to perform a compound operation, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for performing compound operations using security modules. Security modules may be used to securely store cryptographic material. For example, a hardware security module (HSM) may be used to store cryptographic keys that are programmatically unexportable from the HSM. Security modules may be designed to implement a limited number of APIs or operations, which may be exposed to other devices via an interface. An HSM may, for example, implement API commands that allow other devices to perform cryptographic operations, such as encrypting or decrypting data, creating a digital signature, creating a new key in the HSM, and so forth. Generally, an HSM supports a limited number of operations that are related to cryptographic primitives, but does not provide an interface that allows general-purpose computing (e.g., execution of arbitrary instructions) on the HSM.

In various embodiments, a security module implements or otherwise provides an interface that allows clients to submit compound operations to a security module. A compound operation may refer to a chain or sequence of operations that are performed entirely within a protected execution environment. For example, a sequence of several cryptographic operations may be performed entirely within a security module such that only the final result of the sequence is exported from the HSM. In various embodiments, intermediate results that are used to produce the final result are programmatically unexportable from the security module. For example, if the compound operation involves the decryption of a ciphertext encrypted under a first key and then re-encrypting it under a second key, the plaintext is programmatically unexportable during execution of the compound operation.

A security module may comprise an interface by which clients (e.g., other devices) may submit a request to perform a compound operation. The compound operation may be encoded in a domain-specific language (DSL) syntax that only supports the execution of cryptographic primitives in a manner that the user would have been able to perform using individual API requests to perform each cryptographic primitive separately.

In various embodiments, an API request to perform a compound operation comprising a plurality of operations is received at an interface of a security module. A security module interface may route the request to a parser that is used to interpret the compound operation. The parser may be used to translate commands encoded in a domain-specific language to functions or API calls supported by the security module outside the context of compound operations. For example, a set of compound operations according to a DSL syntax may encode instructions to decrypt a ciphertext using an existing key, generate a new key, encrypt the plaintext using the new key, and provide the updated ciphertext as the final result of the compound operation. The parser may interpret the compound operation by mapping portions of the DSL statement to corresponding cryptographic functions that can be executed within the security module. In various embodiments, the parser translates the compound operation to a sequence of operations. The sequence of operations may be encoded in a stack-based format and provided to an execution engine. The execution engine may then perform a sequence of individual operations. Some or all of the individual operations may perform cryptographic operations, such as encryption and decryption operations, and some or all of the individual operations may use cryptographic materials, such as keys that are resident to the security module. In various embodiments, security policies are evaluated prior to the execution of each individual operation. For example, if an individual operation indicates a customer key resident to the security module should be used (e.g., to decrypt data), a policy enforcement module may be queried to ensure that the requestor has sufficient rights to use the customer key in the requested manner.

Accordingly, clients of a security module may use an API to submit different combinations of operations as compound operations rather than submitting several individual operations to accomplish the same functionality. For example, consider an example in which a user wishes to perform a logical sequence of operations to perform a key rotation. In such an example, a user may wish to create a new key, decrypt a ciphertext encrypted under an existing key, and encrypt the plaintext using the new key to produce an updated ciphertext. To perform such a logical operation, a user would have previously submitted three separate API requests to a security module—a first API request to create a new key, a second API request to decrypt a ciphertext under an existing key, and a third API request to encrypt the plaintext that was provided in response to the second API request. Each of these requests may involve submitting requests over a network that introduces overhead in the form of network latency, which may cause delays in the fulfillment of the overall logical operation. Furthermore, the data being re-encrypted is temporarily exposed to the user, which can result in additional risk and/or privacy concerns, especially if the data is sensitive in nature (e.g., includes confidential information and/or data that is subject to privacy laws or regulations). In contrast, a single API request encoding a compound operation may be submitted to a security module to perform the entire logical operation described above. The compound operation may be processed more efficiently than the individual operations because of less network latency, as well as more efficient execution within the security module. For example, a new key may be created in a first operation of the compound operation and retained in memory so that it is still available for use by a subsequent operation of the compound operation. Additionally, techniques described herein may be used to improve the security of computer systems because the confidentiality of potentially sensitive data is preserved during execution of the entire compound operation such that intermediate results are programmatically unexportable from the security module, according to at least one embodiment.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which a security module fulfills a request to perform a compound operation, in accordance with one or more example embodiments of the present disclosure.

A client computing entity 102 may refer to a client (e.g., a computer system or user of such) that communicates with a security module 104. Client computing entity may communicate with security module by submitting application programming interface (API) requests (e.g., API request 106 depicted in FIG. 1) to security module 104 via an interface.

In various embodiments, client computing entity 102 submits webs service API request to a computing resource service provider that hosts or otherwise provides key management and/or cryptography service.

Client computing entity 102 may generate API request 106. API request 106 may refer to a command that a user may specify via a command line interface, graphical user interface, and so forth. API request may be submitted over a network in the form of an HTTP-based request, such as a POST request or a GET request. An API request may be a Representational state transfer (REST) API or RESTful API. API request 106 may be submitted using a command line interface, using a software development kit (SDK) for a programming language, and so forth.

A client may submit different types of API requests to a cryptography service. For example, a client may submit an API request to perform an encryption operation that specifies a key identifier. As another example, and as depicted in FIG. 1, client computing entity 102 may submit API request 106 that encodes a compound operation 108. Compound operation 108 may be executed by security module 104. Compound operation 108 may be encoded using a domain-specific language (DSL) syntax. The DSL may provide a syntax for performing a sequence of operations. In some embodiments, the operations supported by the DSL syntax include only cryptographic functions natively supported by security module 104, such as encryption and decryption operations. In various embodiments, the DSL syntax used to describe compound operation 108 lacks Turing completeness and prohibits branching and/or looping.

Client computing entity 102 may submit API request 106 to a computing resource service provider over a network such as the Internet. API request 106 may be routed (e.g., after performing authentication and/or authorization routines to ensure that the request should be fulfilled) to a cryptography service that utilizes security module 104 to fulfill the request. A cryptography service, such as those described in connection with FIG. 7, may comprise multiple security modules, such as security module 104. Security module 104 may comprise an interface 110. Interface 110 may be used by other devices to communicate with security module 104, for example, to submit requests and receive responses to the requests. For example, interface 110 may include a defined list of commands that devices can submit to security module 104. These commands may include, for example, commands to perform cryptographic operations, such as encryption and decryption, using cryptographic material resident to security module 104.

In various embodiments, API request 106 is routed to interface 110 which then routes respective API requests to respective execution routines that fulfill the request. For example, interface may determine that API request 106 is a request to perform a compound operation. Interface 110 may route API request 106 or a portion thereof to parser 112. Parser may refer to executable code resident to security module 104 that parses compound operation 108. For example, parser 112 may interpret a DSL statement into a plurality of operations, such as operations 108A-N depicted in FIG. 1. Parser 112 may furthermore determine the order in which the operations encoded in the DSL statement should be executed, their operands, and so forth. Parser 112 may then provide one or more operations to execution engine 114 to perform. In some embodiments, parser 112 interprets one portion of the DSL statement into one operation at a time and the operation is provided to execution engine 114 to be performed. In some embodiments, parser 112 interprets the entire DSL statement into a sequence of operations and provides the full sequence of operations to execution engine 114 to perform. Of course, there are several variations on how DSL statements are parsed and executed, and these are contemplated in the scope of this disclosure.

In various embodiments, execution engine 114 schedules and coordinates execution of operations 108A-N, which may be determined using parser 112. In various embodiments, execution engine stores intermediate results in memory—for example, if operation 108A is a decryption operation, execution engine may be responsible for invoking the decryption operation and retaining the resulting plaintext in memory, as it may be used as an input in a downstream operation. In In various embodiments, the individual operations depicted in FIG. 1 are cryptographic functions. A cryptographic function may refer to a set of executable instructions that, as a result of being executed, perform a cryptographic primitive. Examples of cryptographic functions include but are not limited to: keyed one-way hash functions; symmetric key cryptography (e.g., encrypt and decrypt with a shared secret); public-key cryptography (e.g., decrypt with a private key); digital signatures (e.g., create a digital signature); cryptographically secure pseudorandom number generator operations; and more.

In at least one embodiment, the operations that may be specified in a compound operation include only individual (e.g., non-compound) operations that are implemented by security module 104. For example, if a security module only includes encryption and decryption operations, according to at least one embodiment, such a security module will only allow for sequences of compound operations. This may include, for example, a compound operation to decrypt a ciphertext using a first key and encrypt the ciphertext using a second key (e.g., a compound re-encrypt operation), a compound operation to encrypt a plaintext under a first key and the encrypt the resulting ciphertext under a second key to produce a doubly-encrypted ciphertext (e.g., requiring access to two keys to access the underlying plaintext), and any other combination of encrypt/decrypt operations. Of course, security module 104 may include support for other cryptographic operations. In various embodiments, a security module implements operations to perform some or all of the following: cancel key deletion; connect key store; create alias; create key store; create grant; create key; decrypt; delete alias; delete key store; delete imported key material; describe key store; describe key; disable key; disable key rotation; disconnect key store; enable key; enable key rotation; encrypt; generate data key; generate data key pair; generate a random value; get key policy; get key rotation status; get parameters for import; get public key; import key material; list aliases; list grants; list key policies; list keys; list resource tags; put key policy; re-encrypt; replicate key; retire grant; revoke grant; schedule key deletion; generate digital signature; tag resource; untag resource; update alias; update key store; update key description; verify digital signature; and so forth.

In some embodiments, the set of operations that may be included in a compound operation includes individual (non-compound) cryptographic operations supported by security module 104 via interface 110 as well as a limited set of additional operations. For example, in at least one embodiment, compound operation 108 may include arithmetic operations in addition to cryptographic operations. One example use case is a compound operation that decrypts a ciphertext numeric value (e.g., representing a value in US dollars), performs a multiplication operation by an exchange rate (e.g., exchange rate of US dollars to Euros), and encrypts the resulting product as a new ciphertext that encodes the Euro-denominated value. In various embodiments, compound operation 108 supports cryptographic operations native to security module 104 as well as one or more of: string operations (e.g., append, prepend, concatenate), arithmetic operation (e.g., addition, multiplication), bitwise operations (e.g., bitwise AND or bitwise OR), and so forth.

Some or all of operations 108A-N may use cryptographic material 116. Cryptographic material 116 may include, for example, cryptographic keys that are programmatically unexportable from security module 104 and not to be exported from the security module in a plaintext format. Security module may be in accordance with those described in connection with FIG. 8. These cryptographic keys may be used to perform cryptographic functions, such as decrypting data, encrypting data, generating digital signatures, creating new keys, and so forth. In various embodiments, policies are enforced with respect to usage of cryptographic material 116. For example, cryptographic material 116 may comprise customer keys associated with various customers of a computing resource service provider, and a particular customer may only have access to its own keys and not the keys of other customers.

As depicted in FIG. 1, a sequence of operations 108A-N may be executed entirely within the context of security module 104 such that intermediate results (e.g., the results of operation 108A) are not accessible to systems outside of the protected execution environment of security module 104. In various embodiments, the output of the last operation 108N is provided as a result 118. Result 118 may be a plaintext or ciphertext. In various embodiments, plaintext results are validated to ensure that they include only information that would otherwise be exportable to client computing entity 102 via individual (non-compound) requests. Result 118 may be provided to client computing entity 202 via API response 120. API response may, for example, be an HTTP response to an HTTP POST request.

Figure 2:
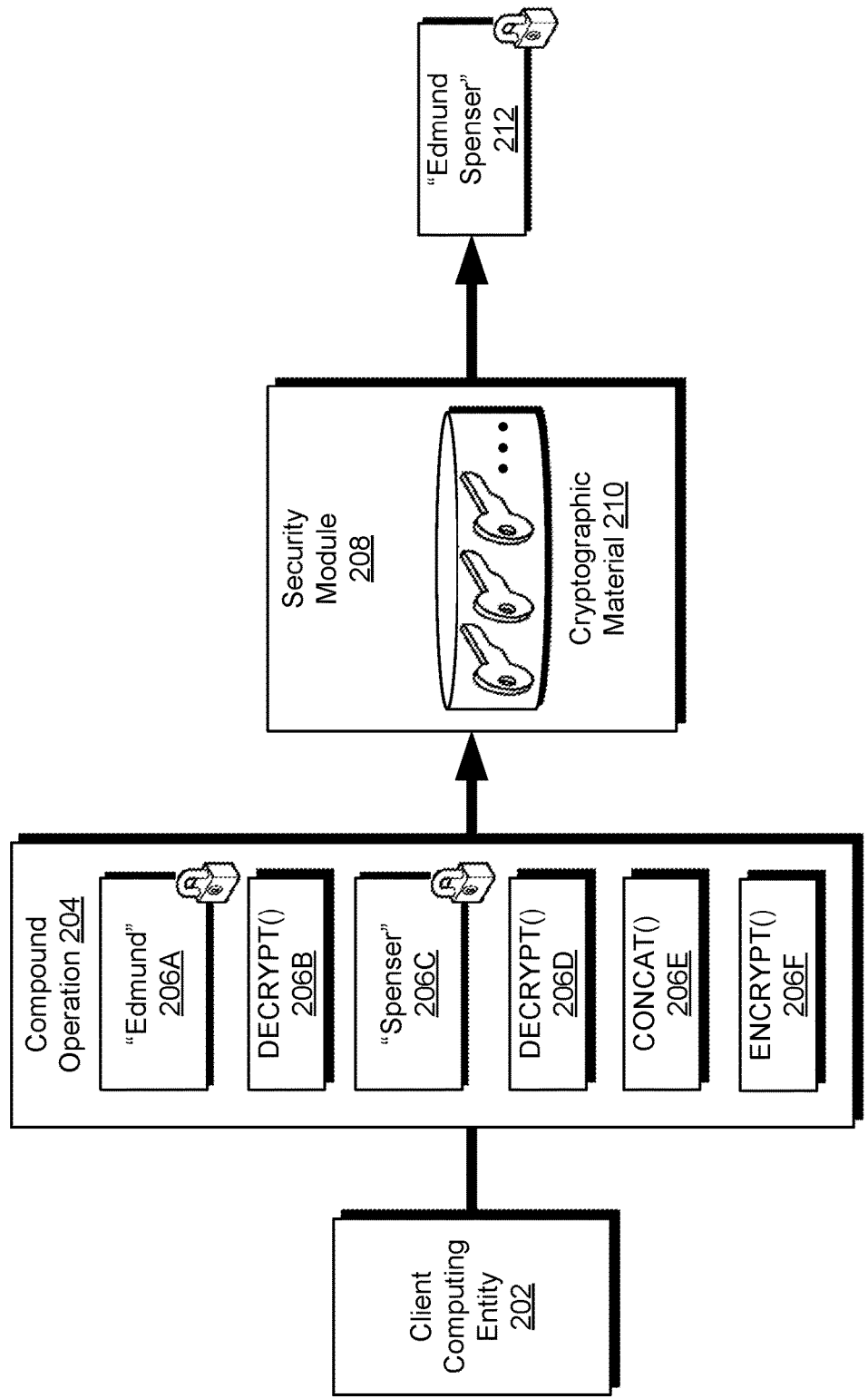
FIG. 2 illustrates a computing environment depicting a compound operation that is processed by a security module, in accordance with one or more example embodiments of the present disclosure.

FIG. 2 illustrates a computing environment 200 depicting a compound operation that is processed by a security module, in accordance with one or more example embodiments of the present disclosure. In various embodiment, FIG. 2 may be implemented in the context of various systems and services, including those described in connection with FIGS. 1 and 6-9, for example.

In at least one embodiment, client computing entity 202 refers to a computer system that submits web service API requests to a computing resource service provider that provides cryptographic services, such as the ability to perform cryptographic operations including but not limited to encryption and decryption operations. A computing resource service provider may comprise a cryptography service, such as those described in connection with FIG. 7. In various embodiments, client computing entity 202 executes code that generates a compound operation 204 and submits the compound operation to a computing resource service provider to be fulfilled using one or more security modules, such as HSMs. In various embodiments, a client submits a web service API request to a frontend server to perform a compound operation. The service may support various API and API signatures, including one such API for performing compound cryptographic with a security module.

In at least one embodiment, compound operation 204 refers to information that is generated or otherwise provided by client computing entity 202 to security module 208 as part of a request. Compound operation 204 may be encoded within an API request. Compound operation 204 may be crafted by a requestor to perform a series of compound operations wherein the entire sequence of operations specified in the compound operation 204 stays resident to the security module such that only the output is exported from the security module. In this way, intermediate results of the compound operation are programmatically unexportable and protected from entities external to the security module.

In at least one embodiment, compound operation 204 comprises a list 206A-F of operations and operands encoded as DSL statements in a stack-based format. The DSL statement may, for example, describe the execution sequence of operations and operands according to postfix notation. For example, numeral 206A refers to a first ciphertext, of the string "Edmund"; numeral 206B refers to a first decryption operation; numeral 206C refers to a second ciphertext, of the string "Spenser"; numeral 206D refers to a second decryption operation; numeral 206E refers to a concatenation operation that concatenates two strings; and numeral 206F refers to an encryption operation. For clarity, certain parameters have been omitted, such as key identifiers indicating the cryptographic material that is to be used to perform the various cryptographic operations, nonces, additional authenticated data (AAD), cryptographic algorithms that are to be used, and so forth. Variations on each of these as well as other parameters used in cryptography are contemplated within the scope of this disclosure.

The list 206A-F may be viewed as a stack in which the first item (e.g., numeral 206A) is popped off the list prior and pushed onto an execution stack prior to accessing the second item (e.g., numeral 206B) in the list. This ordering may be used to define an order of execution. For example, for a list that includes only two items—a ciphertext and a DECRYPT( ) operation, the ciphertext may be first pushed onto an execution stack and then the DECRYPT( ) operation is performed on the ciphertext to generate the corresponding plaintext. Execution of the example compound operation depicted in FIG. 2 is described below in greater detail.

Security module 208 may be configured to perform cryptographic operations in accordance with instructions provided by the request processing unit. For example, a requestor may provide a ciphertext and a KeyID to security module 208 with instructions to the security module to use a key associated with the KeyID to decrypt the ciphertext and provide in response the plaintext. Cryptographic material 210 may refer to various keys and other secret material that should not be exported from the security module 208. For example, cryptographic material may include private keys of an asymmetric key pair, secret keys that are used for symmetric-key algorithms, and so forth. Security module 208 may refer to a hardware security module that has been validated as compliant with a Federal Information Processing Standard (FIPS) outlined in FIPS Publication 140-1 and/or 140-2.

Security module 208 may implement an API for performing compound cryptographic operations. Security module 208 may comprise executable code that, as a result of execution, causes one or more processors of the security module to parse the compound operation and perform compound operation 204 entirely within the protected execution environment of the security module 208. Each operation listed in compound operation 204 may be required to be according to an API that security module 208 implements separately from the compound operation 204. For example, security module 208 may be assumed to implement APIs for DECRYPT( ) and ENCRYPT( ) included in list 206A-F.

Execution of the compound operation 204 by security module 208 may follow a stack-based approach where items from list 206A-F are popped off one at a time and pushed onto an execution stack. Using compound operation 204 depicted in FIG. 2 as an example, processing of compound operation 204 by security module 208 comprises pushing the first item (e.g., numeral 206A) onto an execution stack:

| Execution Stack |
|---|
| E("Edmund") | wherein E("Edmund") refers to a ciphertext of the first name "Edmund."

The next item in the list may be popped and processed for execution. The next item is an operation DECRYPT( ), which is, in this example is assumed to be a unary operation (e.g., KeyID is specified in the request). Here, this would be applying the DECRYPT( ) operation to the ciphertext on the execution stack:

| Execution Stack |
|---|
| DECRYPT(E("Edmund")) |

This results in a plaintext on the execution stack:

| Execution Stack |
|---|
| "Edmund" |

This process may be repeated for items 206C-D, which results in the ciphertext of the surname "Spenser" being decrypted and the plaintext "Spenser" being pushed on the stack as the output of the second DECRYPT( ) operation (e.g., at numeral 204C):

| Execution Stack |
|---|
| "Spenser" |
| "Edmund" |

Next, the CONCAT( ) operation may be assumed to refer to an operation that concatenates two strings together. This operation may take the top two operands on the execution stack and concatenate them together:

| Execution Stack |
|---|
| CONCAT( "Edmund", "Spenser") |

The result of the CONCAT( ) operation is a single plaintext string "Edmund Spenser":

| Execution Stack |
|---|
| "Edmund Spenser" |

Finally, the ENCRYPT( ) operation is performed on the full name "Edmund Spenser":

| Execution Stack |
| --- |
| ENCRYPT("Edmund Spenser") |

This resulting ciphertext of the full name "Edmund Spenser" is then removed from the execution stack and provided as the result of the compound operation. This result 212 may be provided as part of a response to a web service API request.

It should be noted that the intermediate results, such as the plaintexts of the individual first and last name are kept resident to security module 208 and are programmatically unexportable, according to at least one embodiment. In contrast to the techniques described herein, conventional methods to implement the same functionality may involve three separate API calls from the client to a security module (e.g., two DECRYPT( ) calls and one ENCRYPT( ) call) and would involve the client performing the concatenation operation. Each of these calls may involve additional network traffic and round-trip transmission of API requests and responses that may impede the performance of various systems that rely on high-throughput performance of cryptographic operations. In contrast, an embodiment according to FIG. 2 may be implemented with a single API call and a single request, reducing the round-trip time, which may be of great importance in reducing latency, network data usage, and performance, especially in the context of low-energy devices, embedded devices, etc.

Furthermore, using conventional techniques, the plaintext of the first and last names would be accessible from the client, and may introduce a security risk or data leak risk, if such information is confidential, subject to privacy laws or regulations, and so forth. In contrast, an embodiment according to FIG. 2 may be implemented such that intermediate results—such as the plaintexts of the two names outputted by the two DECRYPT( ) calls, are safely stored within the security module in a programmatically unexportable manner, resulting in greater security as compared to conventional approaches.

Figure 3:
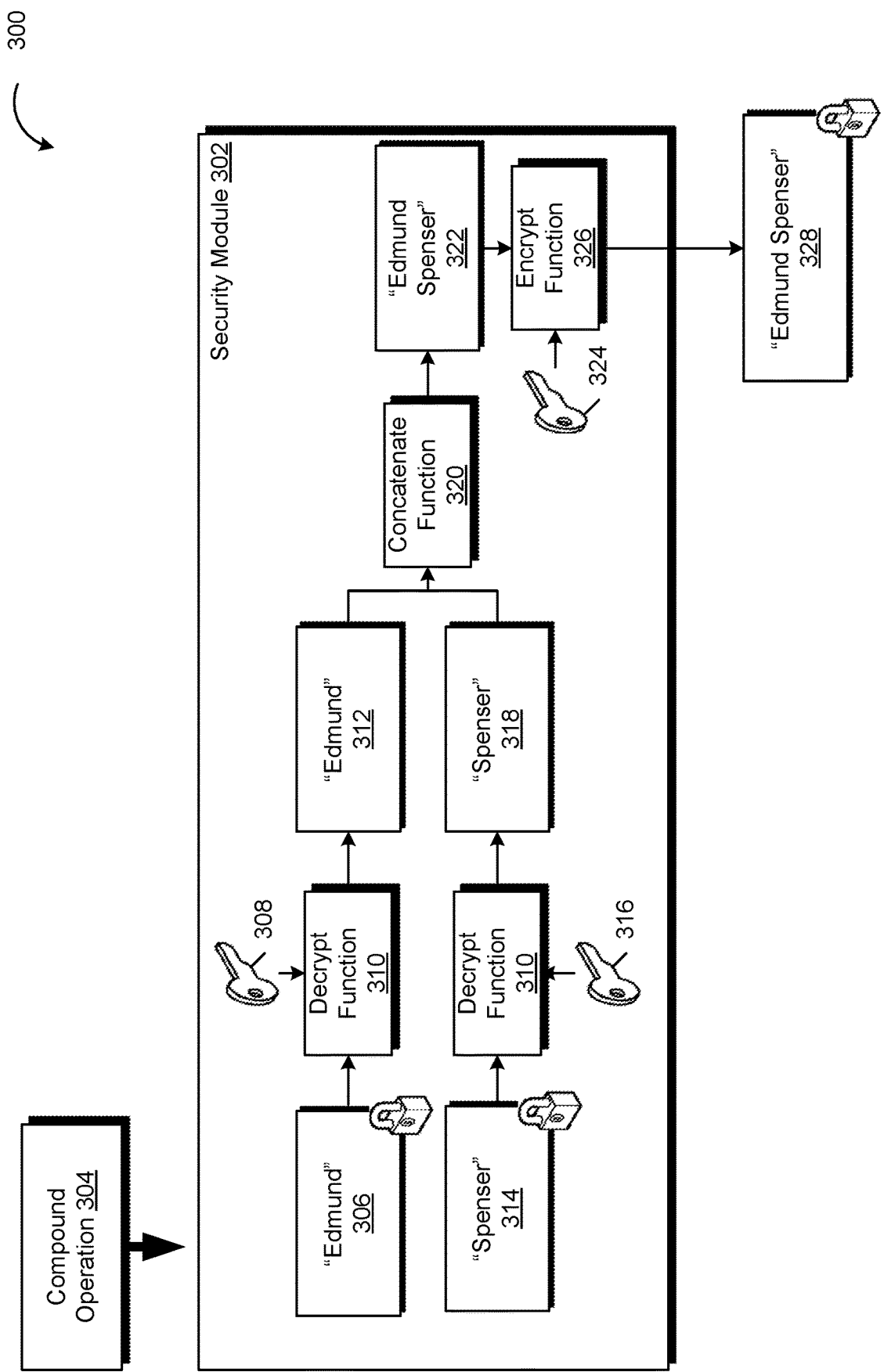
FIG. 3 illustrates a computing environment in which a security module executes a compound operation, in accordance with one or more example embodiments of the present disclosure.

FIG. 3 illustrates a computing environment 300 in which a security module 302 executes a compound operation 304, in accordance with one or more example embodiments of the present disclosure. In some embodiments, FIG. 3 may be implemented in accordance with embodiments described in connection with FIGS. 1-2 and 4-9.

In various embodiments, security module 302 refers to a hardware security module or other types of security modules described throughout this disclosure. Security module may be implemented according to FIG. 8. In some embodiments, security module 302 supports an interface that defines a set of operations or functionality that is supported by security module 302. In some embodiments, security module implements an API that allows for compound operations 304 to be performed in response to a single API request. The compound operation 304 may be encoded in a DSL format. In various embodiments, the compound operation 304 specifies multiple operations that are to be performed within security module 302 using cryptographic material resident to the security module 302. For example, FIG. 3 depicts a compound operation in which two ciphertext strings are provided as operands and the compound operation 304 specifies that the ciphertexts should be decrypted, concatenated together, and then encrypted.

In various embodiments, first ciphertext 306 is an operand that is provided as an input, perhaps encoded in compound operation 304. Compound operation 304 may specify that a decryption operation should be performed on first ciphertext 306 using first key 308. First key 308 may be identified according to a KeyID. First key 308 may refer to cryptographic material that is programmatically unexportable from security module 302. In some embodiments, a customer key resident to security module 302 is used to decrypt an encrypted data key, which is then used to perform various cryptographic operations. Regardless, security module may ensure that the requestor has sufficient privileges to call decrypt function 310 using first key 308. If access is denied, then the execution of the compound function may terminate immediately, and any intermediate results computed may be discarded, rolled back, erased, or otherwise undone. If the operation is authorized, then security module 302 may execute decrypt function 310 to decrypt first ciphertext 306 using first key 308 and produce a first plaintext 312. This may refer to the corresponding first name string "Edmund" depicted in FIG. 3. Likewise, a second ciphertext 314 may be provided as part of compound operation 304 and second key 316 resident to security module 302 may be used in conjunction with decrypt function 310 to produce a second plaintext 318. This may refer to the corresponding surname string "Spenser" depicted in FIG. 3.

In some embodiments, an execution engine or other component of security module 302 may determine whether compound operation 304 includes a subset of operations that can be performed in parallel (e.g., parallelizable operations). For example, in cases where security module 302 supports multithreading or multiprocessor execution, it may be the case that an execution engine analyzes compound operation to determine a first subset of operations that can be performed in parallel with a second set of operations. For example, the decryption operations relating to the first and second ciphertexts may be performed in parallel. However, the concatenate function 320 takes as inputs both the first plaintext 312 and second plaintext 318 and therefore has a dependency on the two decryption operations being completed, and therefore cannot be executed in parallel with the decryption operations.

In various embodiments, a DSL syntax supports cryptographic operations as well as a limited set of additional operations, such a string operations, arithmetic operations, bitwise operations, and various combinations thereof. In at least one embodiment, concatenate function 320 refers to a function that concatenates two strings. In this case, concatenate function 320 is used to concatenate first plaintext 312 and second plaintext 318 to produce a third plaintext 322. This may refer to the corresponding full name "Edmund Spenser" depicted in FIG. 3.

In various embodiments, third plaintext 322 and key 324 are provided to encrypt function 326 to produce third ciphertext 328, which may be the final output of the compound operation. The final output of a compound operation may refer to the output of the last operation in the sequence of operations encoded in the compound operation 304. All other results may be referred to as intermediate results. A final result—but not intermediate results—may be exportable from the security module. It should be noted that the security of computer systems may be improved by using compound operations, which protects the confidentiality of intermediate results. For example, as depicted in FIG. 3, first plaintext 312, second plaintext 318, and third plaintext 322 are never revealed to an external client (e.g., requestor of the compound operation). In various embodiments, the privacy of sensitive data may be maintained throughout execution of operations—this may, for example, involve ensuring that input data that is encrypted remains encrypted throughout the sequence of operations.

Figure 4:
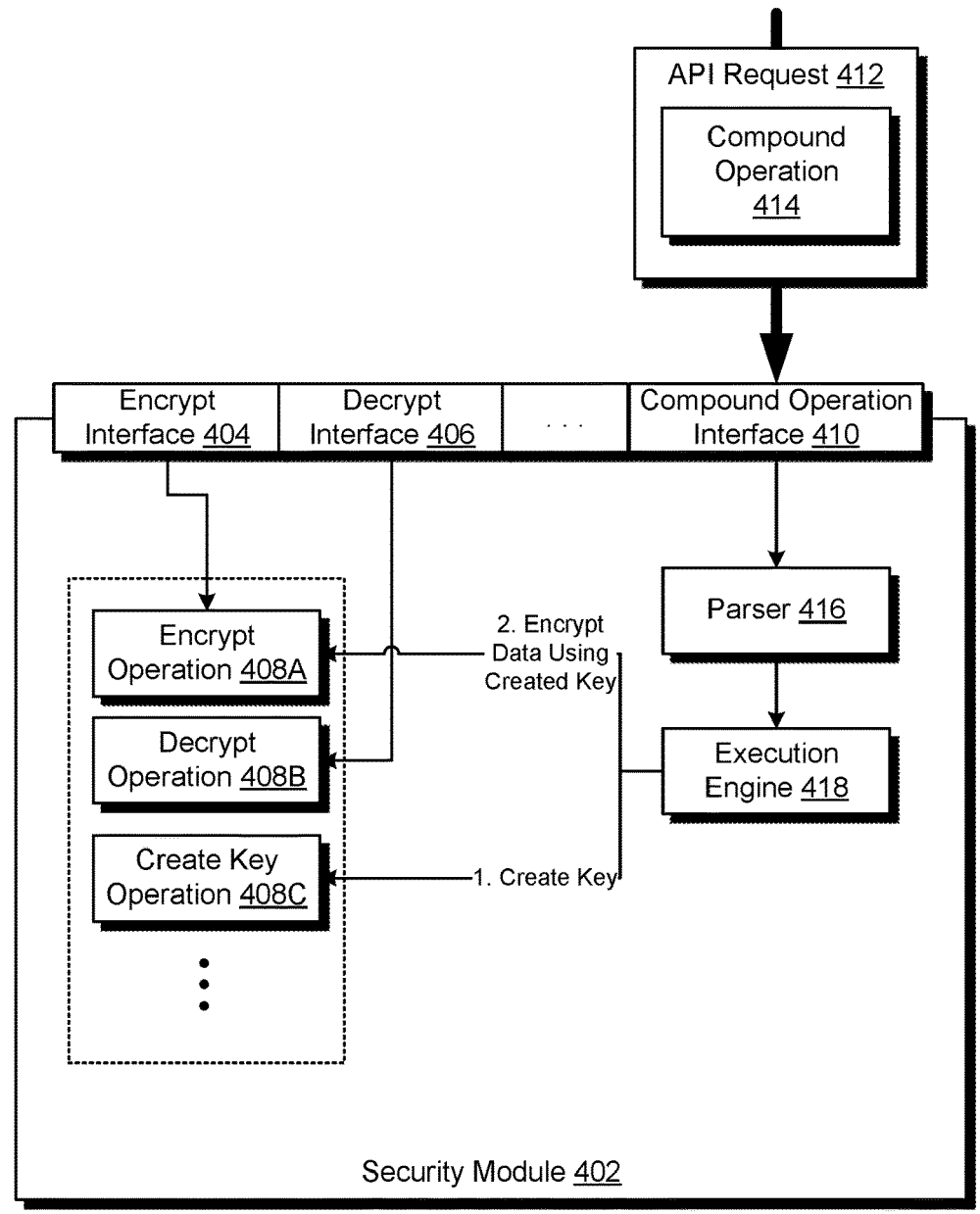
FIG. 4 illustrates a computing environment in which a security module implements compound operations using existing functionality, in accordance with one or more example embodiments of the present disclosure.

FIG. 4 illustrates a computing environment 400 in which a security module 402 implements compound operations using existing functionality, in accordance with one or more example embodiments of the present disclosure. In some embodiments, FIG. 4 may be implemented in accordance with embodiments described in connection with FIGS. 1-3 and 5-9.

Security module 402 may refer to a hardware security module or other electronic hardware that may be used to securely store cryptographic material. Security module 402 may be characterized in that it provides functionality that is focused on or otherwise related to the use or administration of cryptographic material (e.g., cryptographic keys) that is programmatically unexportable from the device. Security module 402 may be in accordance with those described elsewhere, including but not limited to embodiments described in connection with FIG. 8. In at least one embodiment, security module 402 may be extended to support compound operations by applying a firmware update that exposes a new interface for compound operations and implements a parser and execution engine that provides the functionality for the interface. The compound operation may comprise several individual operations. The individual operations may be implemented using existing functionality—that is, functionality that can be invoked from other interfaces that existed prior to such a firmware update. In this way, the implementation of a compound operation can be assured to be safe as it cannot be used to perform any functionality within the security module that an external caller would not have been able to do otherwise by making individual interface calls directly.

In at least one embodiment, security module implements various interfaces, such as an encrypt interface 404 and decrypt interface 406. These interfaces may be used to receive API requests—for example, in the form of HTTP POST or GET—and then route the request to an appropriate operation that executes the requested functionality. For example, if a user submits a web service API request to encrypt data using encrypt interface 404, the data may be routed to encrypt operation 408A, which will then execute a specified encryption algorithm using a specified key on the data. Likewise, a user may provide encrypted data in a web service API request to decrypt data, which is received at decrypt interface 406 and then routed to decrypt operation 408B to be decrypted.

Encrypt operation 408A, decrypt operation 408B, and create key operation 408C depicted in FIG. 4 are non-limiting illustrative examples of functionality that may be natively supported by a security module 402 through individual interfaces that can be invoked separately from the compound operation interface. Various other interfaces may be supported by security module 402. Examples of interfaces that are natively supported by a security module may include some or all of the following: cancel key deletion; connect key store; create alias; create key store; create grant; create key; decrypt; delete alias; delete key store; delete imported key material; describe key store; describe key; disable key; disable key rotation; disconnect key store; enable key; enable key rotation; encrypt; generate data key; generate data key pair; generate a random value; get key policy; get key rotation status; get parameters for import; get public key; import key material; list aliases; list grants; list key policies; list keys; list resource tags; put key policy; re-encrypt; replicate key; retire grant; revoke grant; schedule key deletion; generate digital signature; tag resource; untag resource; update alias; update key store; update key description; verify digital signature; and so forth. These example API requests are non-illustrative in nature, and greater or fewer API commands may be implemented by cryptography service 700. Variations onto the API requests enumerated above are contemplated within the scope of this disclosure.

FIG. 4 further depict extended functionality of a security module 402 to implement compound operations. In at least one embodiment, security module 402 is extended (e.g., with a firmware update) to implement a compound operation interface 410. A compound operation interface 410 may be used to receive API request 412 comprising a compound operation 414. The API request and/or compound operation may be in accordance with those described elsewhere in this disclosure, for example, in connection with FIGS. 1, 7, and 8.

Security module 402 may receive or otherwise obtain compound operation 414 from API request 412. Compound operation 414 may be encoded in a DSL format. Parser 416 may refer to software in the form of executable code (e.g., an executable file, dynamically linked library, static library, and so forth) that is executable by one or more processors of a device to cause the device to parse the DSL statement and identify one or more operations such as operations 408A-C depicted in FIG. 4. Parser 416 may include a mapping table that determine how a DSL syntax maps onto natively supported operations (e.g., operations 408A-C) of security module 402. Parser 416 may map a DSL statement into a sequence of operations that are natively supported by security module 402 and pass the sequence of operations and their operands—which may be specified as intermediate results of operations in the sequence—to execution engine 418.

In various embodiments, execution engine 418 receives a sequence of operations to perform. Execution engine may receive an execution stack comprising operations to execute and their respective operands. The execution engine may operate in accordance with techniques described elsewhere, such as in connection with FIG. 2, according to a stack-based execution model. Regardless, when execution engine 418 determines that an operation is to be executed, execution engine 418 invokes an existing operation that is used to fulfill external API requests. For example, if security module 402 receives a request to perform a compound operation 414 to create a key and encrypt a data field with the newly created key (e.g., to reduce the number of network calls to a cryptography service from two to one), then execution engine 418 may call an existing crate key operation 408C which would have otherwise been callable from an interface (e.g., a Create Key Interface, not depicted in FIG. 4) accessible to external devices to create a key and then call encrypt operation 408A that would have otherwise been callable from external devices via encrypt interface 404 to encrypt the data with the newly created key. In this way, existing functionality that has already been tested and validated may be used to ensure that the execution engine 418 provides the same functionality that would have otherwise been provided by external API calls, but with additional improvements to computer security (e.g., intermediate results are not exposed to external devices) and/or computer performance (e.g., improving efficiency of the computer system by reducing the number of times and/or amounts of data that are exported from the security module).

Figure 5:
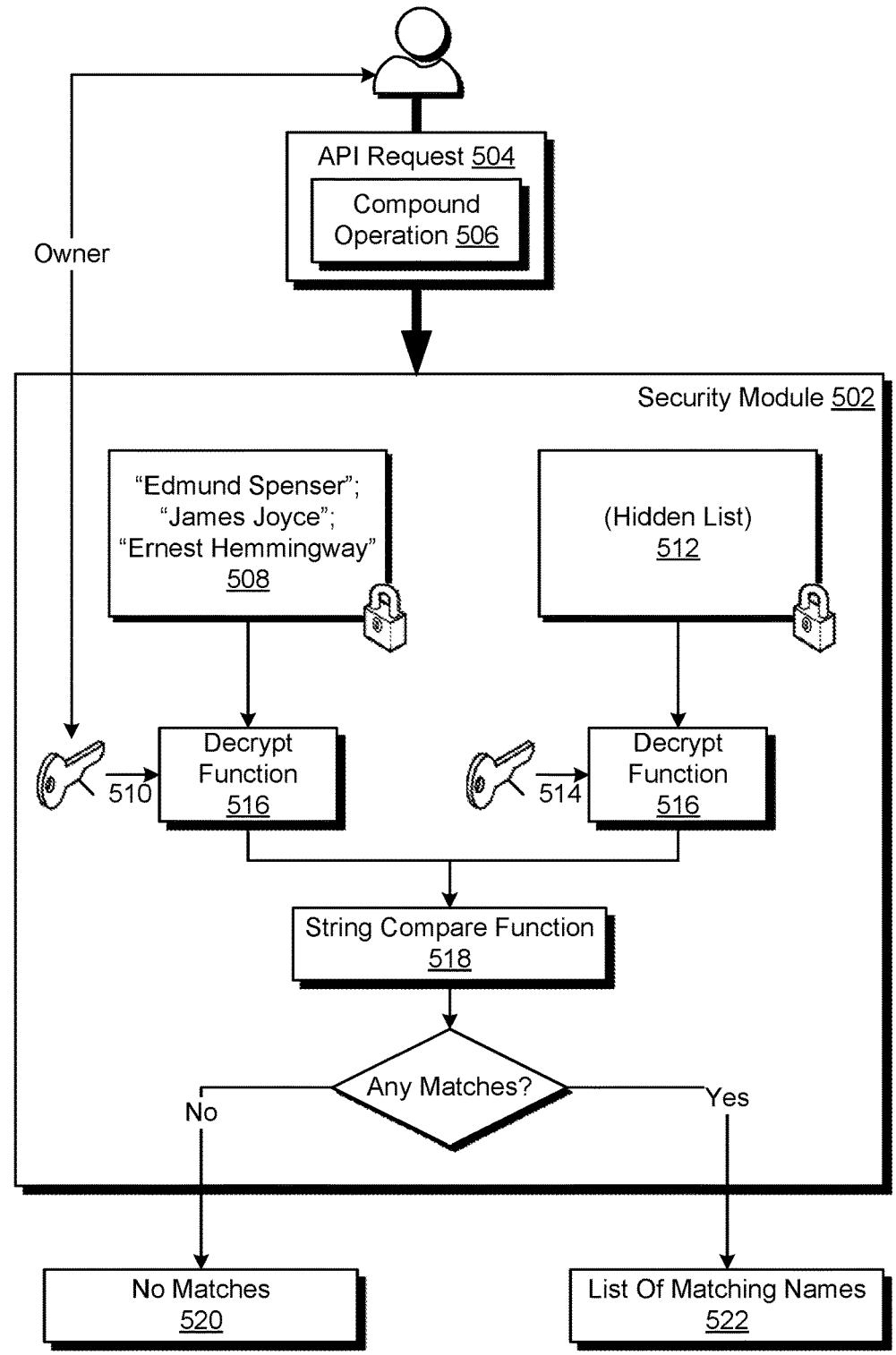
FIG. 5 illustrates a computing environment in which a security module implements a zero-knowledge protocol, in accordance with one or more example embodiments of the present disclosure.

FIG. 5 illustrates a computing environment 500 in which a security module 502 implements a zero-knowledge protocol, in accordance with one or more example embodiments of the present disclosure. In some embodiments, FIG. 5 may be implemented in accordance with embodiments described in connection with FIGS. 1-4 and 5-9.

According to at least one embodiment, security module 502 fulfills API request 504 comprising compound operation 506 according to a zero-knowledge protocol. An example of such a protocol is one in which a client that submits the API request 504 has access to a first list of names and does not have access to a second list of names. For example, the client may be an organization that manages a no-fly list (e.g., first list), and a second organization owns the data for the second list of names, which may be a flight manifest for an upcoming flight. A zero-knowledge protocol in at least one such example may involve a comparison of a no-fly list with a flight manifest such that no information regarding the passengers is revealed if there are no passengers on the no-fly list, and only the names of prohibited fliers are revealed if there is a match. In this way, the privacy of non-prohibited passengers is preserved through such a zero-knowledge protocol.

API request 504 may be in accordance with those described elsewhere, for example, as described in connection with FIGS. 1-4. Compound operation 506 may be encoded in a DSL syntax. In various embodiments, API request 504 and/or compound operation 506 may include information that defines a zero-knowledge protocol.

In various embodiments, client submitting API request 506 has access to a first encrypted list 508. This may, for example, be because first encrypted list 508 was encrypted using a first customer master key 510 that is owned by the requesting client. In contrast, the client may lack access to inspect the contents of second encrypted list 512, which may, for example, be encrypted using a second customer master key 514 associated with a different customer. In various embodiments, security module 502 stores or otherwise has access to both the first customer master key 510 and the second customer master key 514.

In some embodiments, API request 504 includes a token or other authorization information that indicates that the requestor should be allowed to perform certain operations on second encrypted list 512 that the client would not otherwise be allowed to perform individually. For example, API request 504 may comprise a token that allows the second encrypted list 512 to be decrypted and used as an intermediate result, but that the decrypted contents of the second encrypted list 512 may not be exported from the security module in plaintext unless there is a match with the contents of the first encrypted list 508. In some embodiments, the authorization information is provided out-of-band as part of a separate communications with a cryptography service such as those described in connection with FIG. 7.

In various embodiments, a first key is used to decrypt first encrypted list 508, thereby producing a corresponding first plaintext list. Likewise, a second key may be used to decrypt second encrypted list 512 to produce a second plaintext list. A decrypt function 516 may be utilized to produce these plaintexts.

In various embodiments, the plaintext lists are compared using a string compare function 518. In some embodiments, each member of the first list is compared with each member of the second list to determine a common set membership. For example, if the hidden list includes "James Joyce", there would be a common set membership. Other information may be used to corroborate common set membership, including the use of social security numbers, birthdays, etc., to ensure that two different individuals with the same name are not erroneously matched. Various string comparison functions may be used, for example, to account for differences in formatting, diacritics, and so forth. Security module 502 may then determine whether there are any matches between the two plaintext lists. In various embodiments, no information is returned if the lists are disjoint, other than an indication 520 that there is no overlap between the first encrypted list 508 and second encrypted list 512. In some embodiments, if there is an overlap, a list of matching names 522 may be provided, which preserves the confidentiality of non-matching members. In some embodiments, the zero-knowledge protocol simply calls for a Yes/No indication of whether there are matches, and no information regarding the specific contents of the hidden list is provided.

Figure 6:
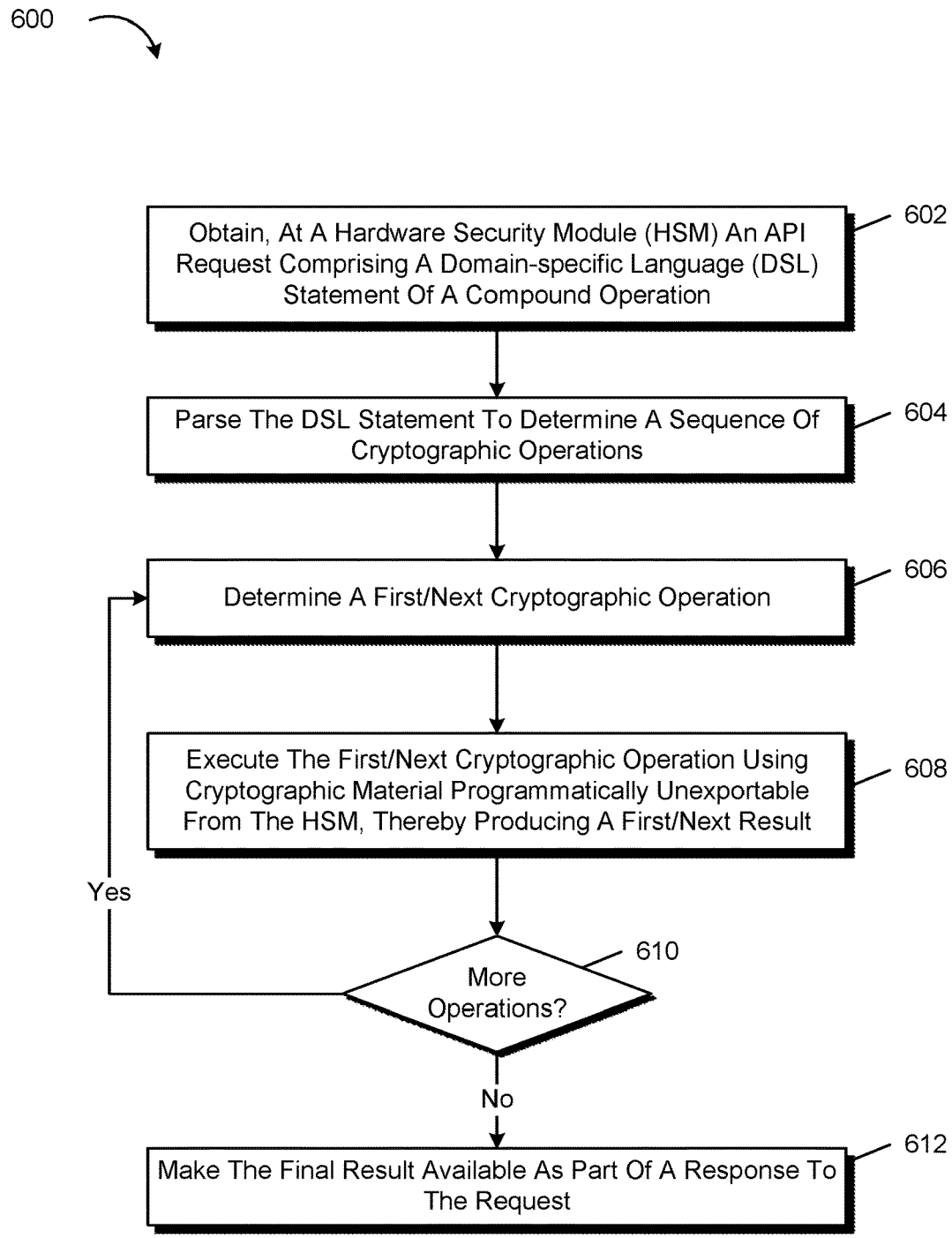
FIG. 6 shows an illustrative example of a process to perform a compound operation, in accordance with one or more example embodiments of the present disclosure.

FIG. 6 shows an illustrative example of a process 600 to perform a compound operation, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5 and 7-9. In at least one embodiment, process 600 or a portion thereof is implemented within one or more security modules of a cryptography service.

In at least one embodiment, process 600 comprises a step to obtain 602, an API request comprising a domain-specific language (DSL) statement of a compound operation. In various embodiments, a security module (e.g., HSM) performs process six or a portion thereof. The API request may refer to a command that a user may specify via a command line interface, graphical user interface, and so forth. API requests may be submitted over a network in the form of an HTTP-based request, such as a POST request or a GET request. An API request may be a Representational state transfer (REST) API or RESTful API. API requests may be submitted using a command line interface, using an SDK for a programming language, and so forth.

In at least one embodiment, process 600 comprises a step to parse 604 the DSL statement to determine a sequence of cryptographic operations. A parser may be used to translate commands encoded in a domain-specific language to functions or API calls supported by the security module outside the context of compound operations. For example, a set of compound operations according to a DSL syntax may encode instructions to decrypt a ciphertext using an existing key, generate a new key, encrypt the plaintext using the new key, and provide the updated ciphertext as the final result of the compound operation. The parser may interpret the compound operation by mapping portions of the DSL statement to corresponding cryptographic functions that can be executed within the security module. In various embodiments, the parser translates the compound operation to a sequence of operations. The sequence of operations may be encoded in a stack-based format and provided to an execution engine. The execution engine may then perform a sequence of individual operations. Some or all of the individual operations may perform cryptographic operations, such as encryption and decryption operations, and some or all of the individual operations may use cryptographic materials, such as keys that are resident to the security module. In various embodiments, security policies are evaluated prior to the execution of each individual operation. For example, if an individual operation indicates a customer key resident to the security module should be used (e.g., to decrypt data), a policy enforcement module may be queried to ensure that the requestor has sufficient rights to use the customer key in the requested manner.

In at least one embodiment, process 600 comprises a step to determine 606 a first cryptographic operation. The first cryptograph operation may be determined by an execution engine that processes stack-based commands. For example, a stack may include operations and operands on a stack hat are popped and processed according to the order in which they were placed in stack. For example, a plaintext field (e.g., input string) may be popped off a stack, followed by a KeyID (e.g., associated with a cryptographic key resident to a HSM), and then an Encrypt( ) operation that receives the plaintext field and KeyID as input parameters indicating how the encryption operation should be performed.

In at least one embodiment, process 600 comprises a step to execute 608 the first cryptographic operation using cryptographic material programmatically unexportable from the HSM, thereby producing a first result. In various embodiments, the cryptographic operation includes one or more of the following: cancel key deletion; connect key store; create alias; create key store; create grant; create key; decrypt; delete alias; delete key store; delete imported key material; describe key store; describe key; disable key; disable key rotation; disconnect key store; enable key; enable key rotation; encrypt; generate data key; generate data key pair; generate a random value; get key policy; get key rotation status; get parameters for import; get public key; import key material; list aliases; list grants; list key policies; list keys; list resource tags; put key policy; re-encrypt; replicate key; retire grant; revoke grant; schedule key deletion; generate digital signature; tag resource; untag resource; update alias; update key store; update key description; verify digital signature; and so forth. In various embodiments, the first result produced as an output of the first cryptographic operation is an intermediate result that is used as an input to a subsequent operation. Intermediate results may be programmatically unexportable from the device.

In at least one embodiment, process 600 comprises a step to determine whether 610 there are more operations in the sequence of operations to perform. If a second operation is determined, then the system may execute a second cryptographic operation using cryptographic material programmatically unexportable from the HSM, thereby producing a second result. In some embodiments, the first result is an input to the second cryptographic operations.

In some embodiments, the system is able to perform operations beyond cryptographic operations, which may include, for example, string operations (e.g., append, prepend, concatenate), arithmetic operations (e.g., addition, multiplication), bitwise operations (e.g., bitwise AND or bitwise OR), and so forth. In other cases, the DSL syntax only supports cryptographic operations that otherwise would be individually callable by the requestor.

In at least one embodiment, process 600 comprises a step to make 612 the final result available, as part of a response to the request after all operations in the sequence of operations have been performed. A final result of the sequence of operations may be made available in any suitable manner. For example, one or more outputs of the last operation in a sequence of operations may be provided as final results in response to a request (e.g., HTTPS Response). In some embodiments, a response includes a network location, universal resource identifier (URI), etc., where results generated by the security module may be found.

The examples presented herein are not meant to be limiting.

Figure 7:
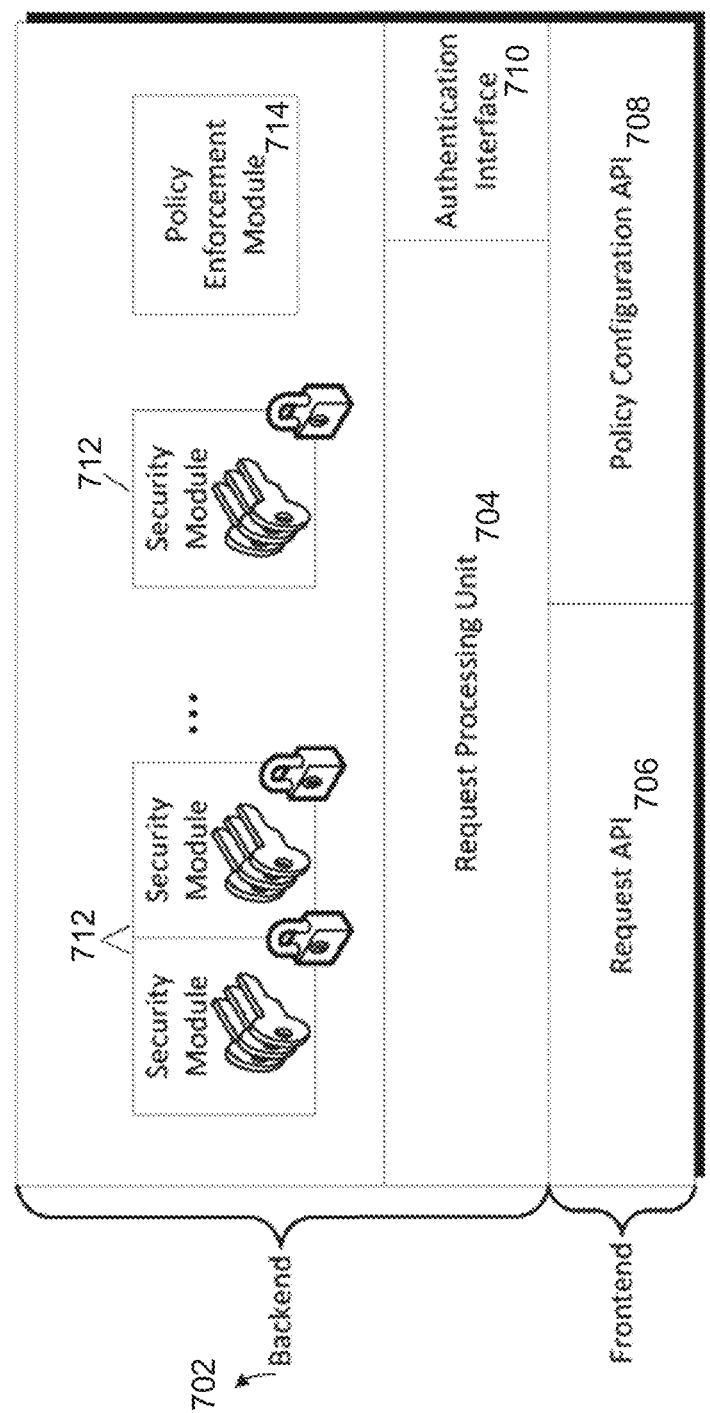
FIG. 7 shows an illustrative example of a cryptography service that may be implemented in accordance with one or more example embodiments of the present disclosure.

As illustrated in FIG. 7, the cryptography service 700 includes a backend system 702 that itself comprises various components in some embodiments. For example, the backend system in this example includes a request processing system (unit) 704 which may be a subsystem of the cryptography service 700 that is configured to perform operations in accordance with requests received through either the request API 706 or the policy configuration API 708. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 710 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 700 also, in this illustrative example, includes a plurality of a security modules 712 (cryptography modules), a policy enforcement module 714, and a coordinator module. One or more of the security modules may be hardware security modules, although, in various embodiments, a security module may be any suitable computer device configured according to the capabilities described herein. Each security module in an embodiment stores a plurality of keys associated with KeyIDs. Each security module may be configured to securely store the keys so as to not be accessible by other components of the cryptography service 700 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ. Security modules described herein, such as security modules 712 depicted in FIG. 7, may be implemented as a security module described in accordance with FIG. 8.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 700 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel the use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information is not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor.

If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 7 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Cryptography service 700 may utilize security modules to fulfill API requests submitted by client computing entities of a computing resource service provider. For example, API requests that involve the performance of cryptographic operations may use security modules to perform cryptographic operations using cryptographic material securely stored within said security modules. Examples of API requests whose fulfillment involves the use of security modules include some or all of the following: cancel key deletion; connect key store; create alias; create key store; create grant; create key; decrypt; delete alias; delete key store; delete imported key material; describe key store; describe key; disable key; disable key rotation; disconnect key store; enable key; enable key rotation; encrypt; generate data key; generate data key pair; generate a random value; get key policy; get key rotation status; get parameters for import; get public key; import key material; list aliases; list grants; list key policies; list keys; list resource tags; put key policy; re-encrypt; replicate key; retire grant; revoke grant; schedule key deletion; generate digital signature; tag resource; untag resource; update alias; update key store; update key description; verify digital signature; and so forth. These example API requests are non-illustrative in nature, and greater or fewer API commands may be implemented by cryptography service 700. Variations onto the API requests enumerated above are contemplated within the scope of this disclosure.

Figure 8:
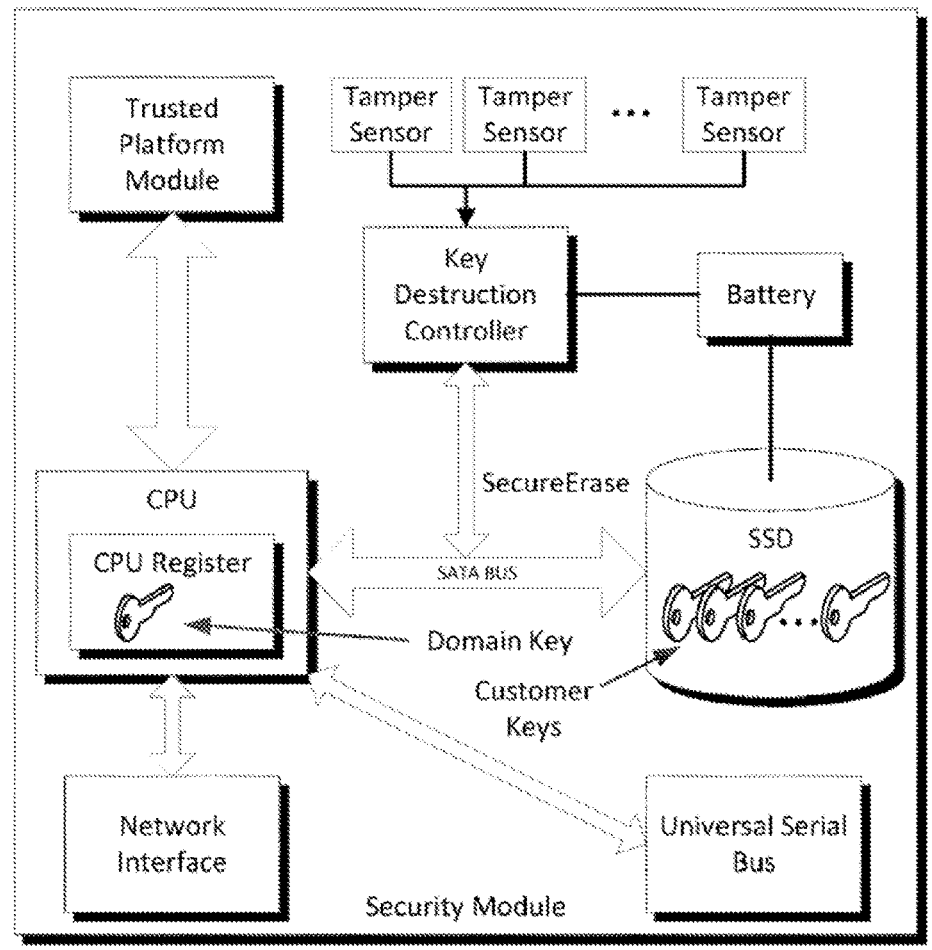
FIG. 8 shows an illustrative example of a security module that may be implemented in accordance with one or more example embodiments of the present disclosure.

As noted above, various types of computer systems may implement security modules such as described above. Generally, any computer system configured to perform operations of the security module may be used in various embodiments. FIG. 8 shows an illustrative example of computing environment 800 with a security module in accordance with an embodiment. In this example, the security module includes numerous components that collectively operate to perform operations. It should be noted that the security module illustrated in FIG. 8 is simplified for the purpose of illustration and that security modules may include additional components which are not illustrated. In addition, in some embodiments certain components are omitted and/or replaced by other components. While not illustrated in the figure, a security module may include a motherboard and/or other appropriate circuitry for electronically connecting the various components that are illustrated. Similarly, a security module may include other components such as a housing, a power supply connectible to a power grid (e.g., through a rack power supply) and/or other components not illustrated in FIG. 8.

As illustrated in FIG. 8, the security module may include a network interface. The network interface may be hardware configured to enable communication of the security module over a network. For example, the network interface may be a network interface controller, also known as a network interface card or network adaptor, comprising hardware configured to enable communication of that security module to other computing devices over a suitable communications network. It should be noted that various types of network interfaces may be used in accordance with the present disclosure and characteristics of a network interface may vary according to different networks used to implement various embodiments of the present disclosure. For example, in an embodiment, the network interface includes an Ethernet network controller that enables the security module to communicate over a local area network. Other types of network interfaces may be used for other types of network communication, such as optical communication over fiber.

Communications received by the network interface may be provided to a central processing unit (CPU) of the security module. For example, electronic requests (e.g., API requests) to perform cryptographic operations may be received through the network interface provided to the CPU for processing. The CPU may be any suitable processor or collection of processors operable to operate in accordance with executable instructions. Further, while a single processor is illustrated, a security module may include multiple processors. Executable instructions may be provided to the processor from local storage and/or the processor may be preprogrammed with the executable instructions. The execution instructions may include instructions to perform various processes such as those described in connection with FIG. 1 and FIG. 6 to perform compound operations. The processor may be a commodity processor or a custom built processor configured to perform operations described herein. As illustrated in the figure, the CPU includes a CPU register that may comprise an amount of data storage for use by the CPU. Further, as illustrated by FIG. 8, the CPU register may be used to store a domain key for a cryptographic domain, which is described in more detail below. The CPU register may also be used for storage of other information, such as one or more customer keys managed by the security module. Further, keys stored in the CPU register may be dynamically determined. For instance, the security module may be configured to measure the frequency of customer key use. A number of the most frequently used customer keys may be stored in the CPU register, thereby increasing the speed at which the CPU is able to access and use the most frequently used customer keys. The customer keys stored in the CPU register may be updated as use frequency changes over time. By storing the domain key and/or other information in the CPU register, a loss of power to the security module, in various embodiments, will result in a loss of access to the domain key and/or other information, even if/when power is restored.

Customer keys, other cryptographic material, and other information stored in a security module may be said to be programmatically unexportable if there is no legitimate way to programmatically cause (e.g., through an interface of the security module) the security module to provide the information. Information, such as customer keys or other sensitive data, may be maintained such that there is no request mechanism (e.g., application programming interface (API) call) for causing hardware, with access to the information in plaintext form, to reveal the information in plaintext form. As an example, the security module may be configured to lack the ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. As a result, absent extraordinary computational effort, a device lacking access to cryptographic material securely stored within a security module is unable to perform various cryptographic operations such as decrypting ciphertexts, generating digital signatures or authentication tags, etc.

Generally, the CPU is configured to communicate with various other components of the security module. For instance, in an embodiment, the security module includes a trusted platform module (TPM). The TPM, in an embodiment, is hardware implementing trusted platform module specifications published by the Trusted Computer Group. For example, in an embodiment, the TPM includes an input/output interface, a cryptographic processor persistent memory and a volatile memory. The cryptographic processor may be configured to perform various cryptographic operations, such as random number generation, key generation such as for RSA keys, hash generation such as for SHA-1 hash generation and/or encryption and/or decryption according to one or more cryptographic algorithms, such as those discussed above. In an embodiment, the TPM is configured to perform various operations such as remote attestation which may comprise generation of a hash-key summary of the hardware and software of the TPM, thereby allowing other entities to verify, using the hash key summary, that software of the TPM has not been modified from an expected stage. The TPM may be a custom TPM or may be a commodity TPM obtained from any of a number of manufacturers such as TPMs produced by Atmel, Broadcom, Infineon, Sinosun, STMicroelectronics, Nuvoton, ITE, Toshiba and/or Intel.

The CPU may be used to execute instructions (e.g., code) to perform various cryptographic operations. Code executed within the security module may be considered to be run within the context of a protected execution environment. A protected execution environment may provide assurances that certain data and/or code that runs within the protected execution environment is not accessible outside of the protected execution environment, without extraordinary measures. For example, attempts by an external entity to inspect the contents of data and/or code within a protected execution environment may cause physical destruction of the security module, hardware components thereof, data stored thereon, or combinations thereof.

In an embodiment, the security module includes a solid state drive (SSD) which stores various information accessed by the CPU in order to perform various operations. For example, in some embodiments, the SSD may store instructions executable by the CPU to enable the CPU to perform various operations described herein. In addition, as illustrated in FIG. 8, the SSD may store one or more customer keys. In an embodiment, a customer key is a key managed by the security module on behalf of another entity such as a user or the data service described above. For the purpose of illustration, keys stored in the SSD of the security module of FIG. 8 are referred to as customer keys and described in connection with embodiments where each customer key is managed on behalf of a customer of a computing resource provider that hosts the security module and, while the term "customer key" is used for the purpose of illustration, and to distinguish from other types of keys, the keys managed by the security module are not necessarily those of customers of a particular entity. For example, various techniques described herein are applicable in a variety of contexts, such as the use of a security module in an organization's internal operations.

The CPU may obtain data from the SSD in various ways. For example, in an embodiment, the security module includes a bus that enables the transfer of data between the CPU and the SSD. In an embodiment, the bus is a serial ATA (SATA) bus, although other buses may be used in accordance with various embodiments and different components that may be utilized as the security module.

In an embodiment, the security module also includes a universal serial bus (USB). The USB enables operators to provide and obtain information from the security module by connecting directly to the security module. For example, as described below, an operator may provide executable instructions for operation of the security module using a flash drive utilizing a USB interface. The security module may be configured to only accept code updates (e.g., firmware updates) via the USB interface. For example, an operator may use the USB to provide updated code to the security module for the purpose of enhancements, bug fixes, and other updates. While a USB interface is used for the purpose of illustration, it should be noted that any suitable wired or other interface may be used in various embodiments. For example, the network interface may be used to provide code updates for the security module, in some embodiments.

In an embodiment, the security module is constructed with enhanced security for customer keys and is managed by the security module. Accordingly, in an embodiment, the security module includes one or more tamper sensors. For example, in various embodiments, components of the security module are enclosed in a housing, which may comprise a metal and/or plastic shell enclosing a cavity in which the components of the security module are positioned. The housing may include multiple components that are secured together with adhesive tape and/or glue that is configured to irreversibly indicate a break in the tape and/or glue caused by an attempt to separate housing components. One or more of the tamper sensors may be configured to detect attempts to open the housing or otherwise gain access into the interior of the housing. For example, a tamper sensor may comprise circuitry configured to change its operational characteristics in accordance with various events that can occur in connection with the housing of the security module. For example, opening the security module may cause an electrical connection to be severed, therefore causing one or more of the tamper sensors to activate. Other sensors may also be used such as vibration sensors, sensors that detect changes in the security module's physical orientation, sensors that detect a loss of power from a main power supply and/or generally any sensors that are configured to detect intrusion into the interior of the security module or other events that trigger erasure of customer keys (such as main power supply losses, as described below). In some embodiments, the housing includes components that are mechanically secured together by a lockable mechanism, such as a latch. The lock may be configured with sensors that activate when an attempt to pick the lock (e.g., an attempt to unlock the lock without a key configured for the lock) occurs. Other types of sensors and/or combinations thereof may also be used.

In an embodiment, the security module is configured such that activation of one or more of the tamper sensors causes customer keys to become inaccessible. Causing customer keys to become inaccessible may be performed in various ways in accordance with the various embodiments. For example, FIG. 8 illustrates one way in which customer keys may be rendered inaccessible. In particular, as illustrated in FIG. 8, the tamper sensors are communicatively connected with a key destruction controller which may be hardware (e.g., circuitry including a processor) configured to issue an erase command to the SSD to erase customer keys when appropriate. In an embodiment, the key destruction controller's processor(s) is/are separate from the CPU, e.g. as part of a data storage subsystem, such that, even if the CPU is inoperable, the key destruction controller is able to operate as described below. For example, in an embodiment, the key destruction controller is electrically connected to the SATA bus such that, when a need to erase customer keys is detected by the key destruction controller, the key destruction controller issues a SecureErase command over the SATA bus to the SSD, thereby causing the SSD to securely erase the customer key stored thereon. In other embodiments, such as where different types of storage devices are used, a different type of command causing lost access to customer keys may be used. In the embodiment illustrated in the figure, the key destruction controller may be electrically connected to the SATA bus in any suitable manner. For example, the key destruction controller may be connected with the SATA bus such that any commands issued simultaneously with the erase command do not conflict, potentially causing the erase command to be unfulfilled by the SSD. For example, the key destruction controller may be configured to break one or more circuits between the SSD and the CPU to disable the CPU's ability to transmit a conflicting command to the SSD. Other techniques for avoiding conflicting commands may also be used.

The key destruction controller may also perform other operations. For example, in an embodiment, the key destruction controller may generate a certificate that states that the SecureErase operation was completed correctly. The certificate may state metadata about the SecureErase operation, such as the time the operation was completed. The security module may, upon reboot or other events, perform a self-test routine to confirm that the SecureErase command was successfully completed. Failure of the self-test may cause the security module to perform one or more predefined operations, such as issuing a SecureErase command again.

Further, as illustrated in FIG. 8, the security module includes a battery, comprising one or more battery cells, to which at least the key destruction controller and SSD are connected. The battery may be rechargeable (e.g., comprising one or more lithium ion or other rechargeable cells) and may be charged during normal operation of the security module by charging circuitry of the security module (not shown). By use of a battery, if a main power supply to the security module is cut off, the battery provides enough power to the key destruction controller and the SSD to enable the key destruction controller to issue the SecureErase command and enable the SSD to fulfill the SecureErase command and securely render the customer keys inaccessible.

It should be noted that the particular configuration of components and the security module are provided for the purpose of illustration and that numerous other components may be used. For example, while FIG. 8 shows an SSD used in accordance with various embodiments, any data storage device may be used. In addition, in other embodiments, customer keys may be stored in volatile memory such that intrusion events and/or a loss of power may cause customer keys to be rendered inaccessible despite the loss of power (from the main power supply). In some embodiments, a volatile memory is separate from the CPU, although, in other embodiments, as noted above, some or all customer keys may be stored in the CPU register. Other variations are also considered as being within the scope of the present disclosure. For instance, in some embodiments, customers are able to specify the type of storage in which keys are to be stored. A customer may, for instance, request that one key be stored in persistent memory (e.g., in one or more SSDs) and another key be stored in volatile memory. Such requests may be part of a request to create a key and/or may be submitted after a key is created. In the latter case, the request may identify key(s) by its/their KeyID.

In an embodiment, a security module operates in a plurality of modes. The plurality of modes, in an embodiment, includes a service mode and a use mode. In the service mode, the security module does not store customer keys and does not store a domain key. For example, the security module may be configured to destroy its access to the domain key and customer keys upon detection of entry into security mode (or, alternatively, upon detection of leaving use mode). Access may be destroyed in any suitable manner, such as through a SecureErase command issued to an SSD storing customer keys, removal of power to volatile memory (e.g., CPU register) storing the domain key and/or one or more customer keys, encrypting the domain key and/or one or more customer keys with another key and then losing access to the other key, overwriting (with random, pseudo-random, or other data) memory locations storing the domain key and/or one or more customer keys and/or destroying access in other ways. In security mode, however, an administrative interface is enabled to allow the security module to receive code updates and to perform other administrative functions. The administrative interface may include a secure shell (SSH) console login, a remotely accessible desktop and/or other functionalities. In an embodiment, the security module transitions between the two modes, although, in other embodiments, the security module may have more than two modes.

In use mode, in an embodiment, the security module is configured to store a domain key and one or more customer keys, to use the domain key and/or one or more customer keys such as described in more detail below. For example, when in use mode, a security module may receive requests to perform cryptographic operations using a customer key identified by a KeyID, perform the requested cryptographic operations, and provide results of the performed cryptographic operations in response to the requests. In use mode, however, some or all administrative interfacing abilities of the security module are disabled. For example, in use mode some or all functionalities available through an administrative interface may be blocked while in use mode, although, in some embodiments, a limited number of administrative capabilities may be allowed. For example, in some embodiments, functions using the simple network management protocol (SNMP) may be available in use mode and/or in other modes. As such, in various embodiments, when in use mode, a security module cannot receive code updates. Other capabilities may also be disabled when in use mode.

In an embodiment, some or all components of a security module are implemented using commodity hardware (e.g., a commodity processor, commodity storage device, commodity TPM, commodity motherboard, commodity sensors, commodity cooling fans and/or other commodity hardware components). Commodity hardware may be hardware configured to operate in accordance with a standard, which may be defined by the International Organization for Standardization or another organization and which may be an open standard. Example standards include industry standard architecture (ISA), peripheral component interconnect (PCI), PCI Express, Universal Serial Bus (USB), Serial ATA (SATA) and other standards. As such, a commodity hardware component of a security module that operates in accordance with a standard may be replaceable by another component, possibly of a different manufacturer, that operates according to the same open standard. In other words, commodity hardware components may be replaced by other components without affecting the operation of the security module. Commodity hardware components may also lack specialization. For example, commodity hardware components may be obtained from a mass producer of the hardware components without the need to specialize the hardware components. In some embodiments, a security module comprises solely commodity hardware. Thus, embodiments of the present disclosure provide numerous technical advantages as they allow the use of commodity hardware (which is obtainable at substantially lower costs than non-commodity hardware) while still ensuring data security.

Security modules in accordance with the present disclosure may be configured to maintain various security measures. For example, in various embodiments, security modules are configured such that customer secrets (e.g., customer keys) may exist in plaintext only in volatile memory. Customer secrets in non-volatile memory must be stored in encrypted form, the encryption performed using a key to which only security modules in the same cryptography domain have access. Further, in various embodiments, security modules are configured such that operators have access to a security module only when the security module itself lacks access to customer secrets in plaintext form. Thus, in such embodiments, a security module cannot be logged into by an operator, although a security module's software stack may provide mechanisms for extracting logs, but will not permit on-box debugging. Logging mechanisms that could expose the contents of volatile memory (or generally that could expose customer secrets in plaintext form) are disabled while the security module has access to the customer secrets in plaintext form. In some embodiments, security modules provide verifiable shredding (destruction) of customer secrets by a quorum mechanism combined with master-key rotation (i.e., rotation of the domain key). Further, in various embodiments, security modules are configured to be unable to make API calls to one another. A cryptography service using such security modules may be configured to coordinate all information transfer among security modules of a cryptographic domain. In various embodiments, security modules are FIPS-compliant and/or have gone through FIPS validation, as discussed above. A security module may use a FIPS validated crypto library and minimize dependencies to ease the validation process.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 9:
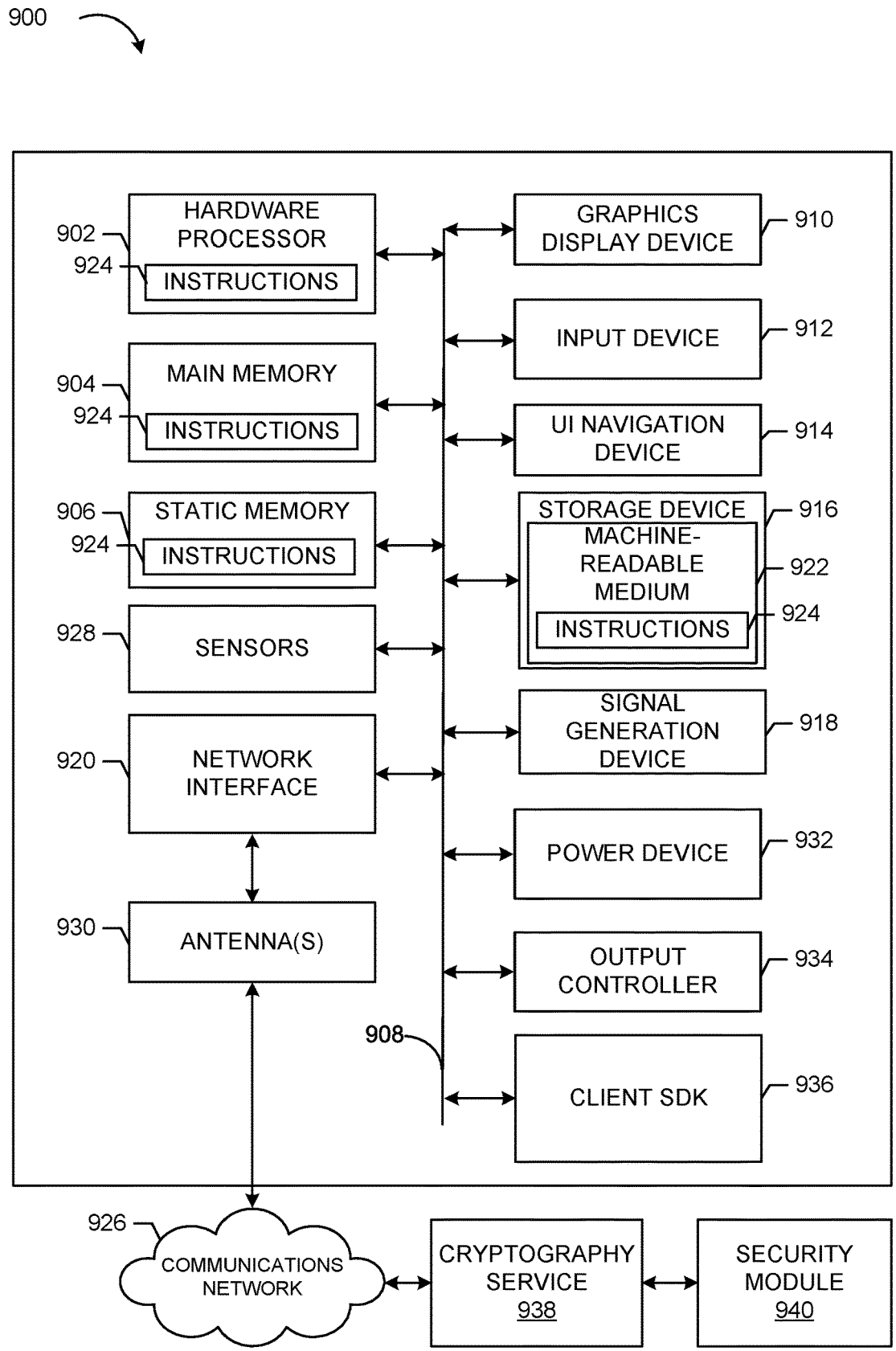
FIG. 9 illustrates a block diagram of an example machine upon which any of one or more techniques (e.g., methods) may be performed, in accordance with one or more example embodiments of the present disclosure.

FIG. 9 illustrates a block diagram of an example of a machine 900 (e.g., implemented in whole or in part in the context of embodiments described in connection with other figures. In some embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in Wi-Fi direct, peer-to-peer (P2P) (or other distributed) network environments. The machine 900 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include any combination of the illustrated components. For example, the machine 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (e.g., drive unit) 916, a signal generation device 918, and a network interface device/transceiver 920 coupled to antenna(s) 930. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that causes the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

In various embodiments, machine 900 comprises a client software development kit (SDK) 936 that refers to a set of libraries that exposes various functionality of cryptography service 938. For example, client SDK 936 may include programming language-specific APIs that can be called from machine 900 to submit requests to cryptography service 938, such as encryption requests, decryption requests, compound operation requests, and so forth. In some embodiments, machine 900 is able to directly submit requests via a command-line interface, HTTP POST Request, and so forth, which does not necessarily require the use of a SDK. Machine 900 may be a client computing entity in accordance with various embodiments described in connection with FIGS. 1-8.

In various embodiments, cryptography service 938 is a service of a computing resource service provider that provides a set of APIs that can be invoked by clients, such as machine 900. Cryptography service 938 may be implemented in accordance with embodiments described elsewhere in this disclosure, such as those discussed in connection with FIGS. 1-8. In some embodiments, cryptography service 938 utilizes one or more security modules (e.g., security module 940 depicted in FIG. 9) to perform cryptographic operations and/or compound operations.

Security module 940 may refer to a hardware security module or other suitable device for performing cryptographic operations. In various embodiments, security module 940 stores cryptographic material (e.g., keys) that are programmatically unexportable from the security module in a plaintext format. In some embodiments, security module 940 provides an interface by which requests to perform compound operations may be submitted. In various embodiments, security module includes executable code to fulfill compound operations using a parser, execution engine, and various other components. In various embodiments, security modules may be updated via firmware to handle compound operations. Security module 940 may be implemented in accordance with embodiments described elsewhere in this disclosure, such as those discussed in connection with FIGS. 1-8.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
   obtaining, from a client computing entity, a web service application programming interface (API) request, wherein the web service API request comprises a domain-specific language (DSL) statement;
   parsing, at a hardware security module (HSM), the DSL statement to determine a sequence of cryptographic operations;
   determining, at the HSM, a first cryptographic operation of the sequence of cryptographic operations to perform;
   performing, at the HSM, the first cryptographic operation using first cryptographic material that is programmatically unexportable from the HSM, thereby producing a first result, wherein performing the first cryptographic operation comprises decrypting a ciphertext indicated in the web service API request using a first cryptographic key, thereby generating a plaintext;
   determining, at the HSM, a second cryptographic operation of the sequence of cryptographic operations to perform;
   performing, at the HSM, the second cryptographic operation using the first result and second cryptographic material that is different than the first cryptographic material and programmatically unexportable from the HSM, thereby producing a second result, wherein the performing the second cryptographic operation comprises encrypting the plaintext using a second cryptographic key, thereby generating a second ciphertext; and
   making the second result available to the client computing entity as part of a response to the web service API request.

2. The computer-implemented method of claim 1, wherein the first result is programmatically unexportable from the HSM.

3. The computer-implemented method of claim 1, wherein the first cryptographic operation is callable from a second web service API request.

4. A system, comprising:
   one or more processors; and
   memory storing executable instructions that, as a result of execution by the one or more processors, cause the system to:
      obtain a request to perform a compound operation;
      parse the compound operation to determine a sequence of operations;
      perform the sequence of operations within a protected execution environment, wherein performing the sequence of operations includes,
         perform a first operation of the sequence of operations, wherein the first operation comprises a decryption operation on a ciphertext using a first cryptographic key, thereby producing a plaintext as a first result, wherein the plaintext and the first cryptographic key are programmatically unexportable from the system, and perform a second operation of the sequence of operations, wherein the second operation comprises an encryption operation on the plaintext using a second cryptographic key that is different from the first cryptographic key, thereby producing a ciphertext as a second result, wherein the second cryptographic key is programmatically unexportable from the system;

determine, based on the second result, an output; and make the output available to a device outside of the protected execution environment.

5. The system of claim 4, wherein executable instructions to parse the compound operation include instructions that, as a result of execution by the one or more processors, further cause the system to:

determine, based on a domain-specific language (DSL) syntax, a first portion of the compound operation corresponds to data for a first operand;

determine, based on the DSL syntax, a second portion of the compound operation corresponds to a first operation; and store the first operand and the first operation for execution as part of the sequence of operations.

6. The system of claim 5, wherein the DSL syntax lacks Turing completeness.

7. The system of claim 4, wherein the sequence of operations comprises:

at least one string operation;
at least one arithmetic operation; or
at least one bitwise operation.

8. The system of claim 4, wherein executable instructions include further instructions that, as a result of execution by the one or more processors, cause the system to further:

determine input data of the compound operation is sensitive;

verify that sensitivity of the input data is maintained across the sequence of operations; and perform the sequence of operations based at least in part on successfully verifying that the sensitivity of the input is maintained.

9. The system of claim 4, the sequence of operations is encoded in a stack-based format.

10. The system of claim 4, wherein the system comprises a hardware security module (HSM).

11. A non-transitory computer-readable storage medium storing executable instructions that, as a result of being executed by one or more processors of a device, cause the device to at least:

obtain a request comprises a domain-specific language (DSL) statement;

parse the DSL statement to determine a plurality of operations supported by the device;

execute the plurality of operations, wherein performing the sequence of operations includes, perform a first operation of the sequence of operations, wherein the first operation comprises a decryption operation on a ciphertext using a first cryptographic key, thereby producing a plaintext as a first result, wherein the plaintext and the first cryptographic key are programmatically unexportable from the system, and perform a second operation of the sequence of operations, wherein the second operation comprises an encryption operation on the plaintext using a second cryptographic key that is different from the first cryptographic key, thereby producing a ciphertext as a second result, wherein the second cryptographic key is programmatically unexportable from the system; and provide, based on the second result, a result of executing the plurality of operations in response to the request.

12. The non-transitory computer-readable storage medium of claim 11, wherein the plurality of operations are executed within a protected execution environment, wherein one or more intermediate results generated as part of execution of the plurality of operations are programmatically unexportable.

13. The non-transitory computer-readable storage medium of claim 11, wherein the DSL statement is according to a DSL syntax that supports at least one of:

string operations;
arithmetic operations; or
bitwise operations.

14. The non-transitory computer-readable storage medium of claim 11, wherein the plurality of operations comprises:

a first cryptographic operation that is callable, by an external device, from a first application programming interface (API); and a second cryptographic operation that is callable, by the external device, from a second API.

15. The non-transitory computer-readable storage medium of claim 11, wherein the instructions, as a result of being executed by the one or more processors of the device, further cause the device to:

determine a first subset of the plurality of operations can be executed in parallel with a second subset of the plurality of operations;

execute the first subset of the plurality of operations on a first processor of the one or more processors; and execute the second subset of the plurality of operations on a second processor of the one or more processors.

16. The non-transitory computer-readable storage medium of claim 11, wherein the instructions, as a result of being executed by the one or more processors of the device, further cause the device to:

execute an operation of the plurality of operations that produces an intermediate result, wherein:

the intermediate result is programmatically unexportable from the device; and a client associated with the device lacks sufficient permissions to individually perform the operation.

17. The non-transitory computer-readable storage medium of claim 11, wherein the device is a security module.

* * * * *